United States Patent
Kraai (10) Patent No.: US 10,850,581 B1
(45) Date of Patent: Dec. 1, 2020

(54) ARCUATE FIFTH-WHEEL HITCH

(71) Applicant: Dethmers Manufacturing Company, Boyden, IA (US)

(72) Inventor: Jason J. Kraai, Hull, IA (US)

(73) Assignee: Dethmers Manufacturing Company, Boyden, IA (US)

( * ) Notice: Subject to any disclaimer, the term of this patent is extended or adjusted under 35 U.S.C. 154(b) by 87 days.

(21) Appl. No.: 15/363,963

(22) Filed: Nov. 29, 2016

(51) Int. Cl.
*B60D 1/42* (2006.01)
*B60D 1/01* (2006.01)

(52) U.S. Cl.
CPC ............ *B60D 1/42* (2013.01); *B60D 1/015* (2013.01)

(58) Field of Classification Search
CPC .................................. B60D 1/42; B60D 1/015
USPC ....................................................... 280/438.1
See application file for complete search history.

(56) References Cited

U.S. PATENT DOCUMENTS

| | | |
|---|---|---|
| 2,013,032 A | 9/1935 | Chelle |
| 2,144,243 A * | 1/1939 | Fraser .................... B62D 53/08 280/434 |
| 3,572,643 A | 3/1971 | Birdsall |
| 3,874,530 A | 1/1975 | Purdy |
| 4,129,164 A | 12/1978 | Torikai |
| 4,162,017 A | 7/1979 | Noyon |
| 4,240,772 A | 12/1980 | Wyatt |
| 4,353,312 A | 10/1982 | Brouwer |
| 4,359,234 A * | 11/1982 | Mittelstadt ......... B62D 53/0814 280/438.1 |
| 5,628,608 A | 5/1997 | Linscheid et al. |
| 5,941,549 A * | 8/1999 | Kaim ..................... B62D 53/08 280/432 |
| 6,308,977 B1 | 10/2001 | Pulliam et al. |
| 6,357,777 B1 | 3/2002 | Linger et al. |
| 6,935,650 B2 | 8/2005 | Grinde et al. |
| 7,490,846 B2 | 2/2009 | Kaun |
| 7,506,886 B2 * | 3/2009 | Warnock ............ B62D 53/0814 280/407 |
| 7,753,392 B2 | 7/2010 | Warnock |
| 8,047,757 B1 | 11/2011 | Wood |
| 8,220,818 B1 * | 7/2012 | Pulliam .............. B62D 53/0814 280/441 |
| 8,328,221 B2 | 12/2012 | Colibert et al. |
| 8,328,497 B2 | 12/2012 | Wood |
| 8,511,903 B2 | 8/2013 | Masuda et al. |
| 8,648,297 B2 | 2/2014 | Chen et al. |

(Continued)

*Primary Examiner* — Ruth Ilan
*Assistant Examiner* — Felicia L. Brittman
(74) *Attorney, Agent, or Firm* — Brick Gentry PC; Brian J. Laurenzo; Jessica L. Susie (57) ABSTRACT

A fifth-wheel hitch assembly is provided having a rotatable and slidable trailer hitch and a base with an arcuate guide along which the trailer hitch may slide rearward relative to the tow vehicle. A guide ramp directs the trailer hitch into one end of the arcuate guide depending on the relative motion of the tow vehicle to which the base is mounted. A capture mechanism is also provided on the trailer hitch which transfers rotational movement from the trailer to the base of the trailer hitch which, upon a minimum amount of travel, activates the guide ramp to guide the trailer hitch into the arcuate guide moving the trailer hitch head rearward relative to the initial position over the rear axle of the tow vehicle. The hitch assembly also provides for return travel of the trailer hitch head upon opposing rotational movement exerted on the trailer hitch head.

24 Claims, 9 Drawing Sheets

(56) References Cited

U.S. PATENT DOCUMENTS

| | | | |
|---|---|---|---|
| 9,511,804 B2* | 12/2016 | Curl | B62D 53/0807 |
| 2007/0187925 A1* | 8/2007 | Lindeman | B62D 53/0814 |
| | | | 280/438.1 |
| 2010/0209223 A1 | 8/2010 | Van Mill et al. | |
| 2015/0097355 A1 | 4/2015 | Kraai | |

* cited by examiner

ARCUATE FIFTH-WHEEL HITCH

FIELD OF THE INVENTION

The present invention relates generally to a hitch for connecting a vehicle to a trailer to allow the trailer to be towed by the vehicle. More specifically, the present invention relates to a hitch that slides in an arcuate path. The preferred embodiment of the present invention utilizes a slidable, rotatable hitch assembly in conjunction with arcuate guides to allow the slidable hitch assembly to move along an arc.

BACKGROUND

Trailers are typically secured to vehicles to allow the vehicle to tow the trailer behind the vehicle. Trailers can include open carts to transport loads, covered containers for transporting various items, and recreational living quarter trailers, among others. There are many means of connecting a trailer to a vehicle including what is known as a fifth-wheel trailer hitch. In a fifth-wheel trailer hitch, the trailer includes a forward projecting arm with a vertical kingpin projecting out of a horizontal portion of the forward projecting arm. The kingpin is received by a corresponding slot on a trailer hitch plate attached to the vehicle to tow the load. The kingpin is secured in the slot of the trailer hitch so that the vehicle can tow the trailer without disengaging the kingpin.

The fifth-wheel trailer hitch assembly has many advantages that make it suitable for towing large trailers. Particularly, the engagement of a pin in a horizontal surface of the trailer hitch assembly allows the trailer hitch to be located at any location on a vehicle as desired by the user. In contrast, a tow ball trailer hitch assembly is limited to attaching a trailer at the rear end of a vehicle. The ability of the fifth-wheel trailer hitch assembly to be located as desired by the user allows the trailer hitch of the fifth-wheel assembly to be located closer to, or at the center of, the vehicle at a point above and/or in front of the rear axle of the tow vehicle. This placement serves to transfer the weight of the trailer applied on the trailer arm to a position above the axles rather than at a distance at the end of the vehicle such as in a tow ball configuration. The placement of a portion of the load above the axle reduces the stress on the frame and bumper of the tow vehicle. Additionally, the weight transferred to the rear tires is not as great in a fifth-wheel configuration compared to a tow ball configuration. This is because, in a tow ball configuration, the weight of the trailer is applied at the end of the vehicle creating a moment arm due to the distance between the tow ball and the rear axle, thus increasing the weight applied to the rear tires compared to a fifth-wheel hitch assembly.

However, a traditional fifth-wheel hitch assembly has several disadvantages. When traveling in a straight line with a fifth-wheel hitch attached trailer, the rear edge of the tow vehicle and the front edge of the trailer are parallel and do not come in contact with one another. However, as the tow vehicle begins to turn, the front edge of the trailer will be rotated relative to the rear edge of the tow vehicle. This will cause the corner of the trailer to come closer to its opposing corner on the tow vehicle. Accordingly, if the trailer arm connecting the trailer to the fifth-wheel hitch is not long enough, the trailer may come in contact with the opposing corner of the tow vehicle when negotiating a turn.

To avoid the aforementioned issue, relatively long trailer arms must be used to provide enough clearance between the trailer and the tow vehicle to anticipate all the necessary orientations of the trailer during maneuverers performed by the tow vehicle. However, increasing the length of the trailer arm, decreases the efficiency of the towing operation. Specifically, as the distance between the tow vehicle and the trailer increases, the drag and instability of the towed trailer also increases. Thus, it is desirable to keep the distance between the trailer and the tow vehicle to a minimum.

In the past, users and manufacturers have struck a balance between the distance from the back of the tow vehicle to the front of the trailer to allow a sufficient range of maneuverability while maintaining as much efficiency as allowed. What is desired is a fifth-wheel hitch assembly that can move to the rear of the tow vehicle when the tow vehicle is negotiating a turn or needs additional maneuverability. This improved, rearward-moving fifth-wheel hitch should also be able to move forward after the tow vehicle has completed a maneuver to an optimal straight line tow position, thus increasing the efficiency and stability between the tow vehicle and trailer.

Various attempts have been made to provide a fifth-wheel trailer hitch assembly that may be slid to multiple, lockable positions. In such an assembly, the user can unlock the hitch assembly and slide it to a more rearward, second position. The second position allows the vehicle and trailer to maneuver more easily through a tight turn. After completing the maneuver, the user may unlock the hitch assembly and slide it back to the first position. An example of a manually slidable and lockable fifth-wheel trailer hitch is shown in U.S. Pat. No. 6,357,777 to Linger et al.

These types of manually slidable hitch assemblies cannot automatically move toward the rear of a two vehicle to allow the trailer to clear the end of the vehicle while negotiating a tight turn. Instead, the entire vehicle and trailer must be stopped so the user can move the hitch assembly. After completing the turn, the user must again stop the entire vehicle and trailer and move the hitch assembly back to the first position for straight line towing. This is a time consuming and cumbersome process. Additionally, if the user forgets to slide the trailer to the second position before taking a tight turn, the above-mentioned damage to the vehicle and trailer will still likely occur.

In addition, various attempts have been made at auto-sliding hitch assemblies by providing a pair of substantially perpendicular slots with a common body having a pivot in each of the slots. The body, which contains the slots, is connected to a trailer and a vehicle. When the trailer and thereby the body is rotated relative to the slots and the vehicle, the pivot, located in a slot perpendicular to the vehicle, is displaced laterally in the vehicle thereby allowing a pivot located in a slot parallel to the vehicle to be displaced longitudinally relative to the vehicle. As the trailer hitch is mounted substantially above the second pivot point, the trailer hitch will be displaced longitudinally relative to the towing vehicle as the vehicle and trailer negotiate a turn. This type of hitch assembly is highly dependent upon anti-friction means such as grease or bearings. Accordingly, if the assembly is not maintained properly, large angle turns negotiated by the tow vehicle may induce too large a force on the assembly and may therefore jam the assembly. An example of such a system is disclosed in U.S. Pat. No. 6,308,977 to Pulliam et al.

Another attempt at an auto-sliding hitch assembly provides a base with a corresponding hitch. The hitch pivots between an aligned position and a turning position. As a vehicle with an attached trailer turns, the hitch assembly moves from the aligned position to the turning position. A bearing assembly that rides between the base and the hitch guides the hitch assembly to this position change. Moreover, the hitch assembly includes a bushing mounted on the lever arm of the hitch assembly to reduce friction and noise as the hitch assembly moves longitudinally rearward along the base, which is mounted with the longitudinal plane of the towing vehicle. Once the hitch assembly is moved to the turning position by the bearing assembly, it is allowed to slide longitudinally to the back of the base and, correspondingly, the towing vehicle, with the aid of the bushing to keep friction to a minimum, toward a rearward position in the towing vehicle's bed. This type of system is disclosed in U.S. Pat. No. 8,220,818 to Pulliam et al.

Other prior art systems, such as U.S. Pat. No. 7,490,846 to Kaun, provide a hitch assembly that automatically pivots and moves longitudinally rearward away from the cab of the tow vehicle in response to pivotal movement between the trailer and the tow vehicle. This may be achieved by utilizing two coupling means, a first coupling means for coupling with a trailer at the pivot point, which may be a ball and socket joint, and a second coupling means for coupling a trailer at a towing point. The first coupling means pivots in response to rotational movement from the vehicle, which allows the hitch assembly to move longitudinally toward the rear of the tow vehicle. Alternative embodiments of this system also provide for a non-pivoting system wherein the assembly uses a linkage arm capable of transferring a majority of the towing force between the tow vehicle and the trailer and is responsive to pivoting from the trailer to allow the hitch assembly to slide longitudinally rearward in relation to the tow vehicle.

The aforementioned systems presently known and utilized in the art are limited in their longitudinal movement of the hitch assembly based on the length of the straight-line tracks that can be utilized in the base of each device. Additionally, the straight-line, longitudinal tracks must be designed to the specific base size requirements necessary to successfully mount the base within the bed of a tow vehicle. This can be especially challenging when dealing with short-bed pickup truck towing vehicles. Moreover, the aforementioned systems known in the art use relatively complex bushings, bearing assemblies, and couplings and are reliant on anti-friction means such as grease to maintain their functionality.

Additionally, with traditional auto-slide systems, the trailer hitch freely moves along the straight line paths of the hitch. The traditional systems only allow rearward movement upon detection of necessary movement, typically rotational movement, of the trailer hitch. However, traditional systems do not typically use mechanisms to lock the trailer hitch in a rearward position as a lock can cause issues of its own when attempting to return the trailer to a straight-line tow position. The freely movable, rearward position of the trailer hitch in traditional systems can lead to a problem known as slide-up. This is typically caused by sudden deceleration forces applied to the towing vehicle of traditional systems which causes the trailer to exert force on the trailer hitch causing it to slide up along the longitudinal guide of the traditional hitch assembly. This can lead to unwanted results, such as the trailer suddenly and abruptly applying forces on the traditional trailer hitch which can, in turn, transfer the force to the tow vehicle causing damage or unintended movement of the tow vehicle.

Accordingly, there is a need in the art for a fifth-wheel hitch assembly allowing for greater movement within the confines of current design standards for bases to be mounted in tow vehicles. Furthermore, there is a need in the art for fifth-wheel hitch assemblies with simpler and more reliable rotational and slidable movement mechanisms.

SUMMARY

Accordingly, an arcuate fifth-wheel hitch assembly is provided which improves on the prior art. The fifth-wheel hitch assembly of the present invention includes a trailer hitch to receive the kingpin of a trailer hitch arm. The trailer hitch head allows for both rotational movement and slidable movement within the base of the hitch assembly. The base of the trailer hitch assembly includes one or more arcuate guides with which the trailer hitch head moveably interfaces. This arcuate guide defines the range of slidable motion for the connected trailer hitch head, and, consequently, the attached trailer, allowed by the hitch assembly. Moreover, the trailer hitch head of the present invention may include a capture mechanism to efficiently transfer rotational movement from the connected trailer to the base of the trailer hitch head.

In a first embodiment of the invention, an arcuate fifth-wheel hitch assembly is provided. The assembly includes a trailer hitch head to receive a portion of a trailer. The trailer hitch head also allows for rotational and slidable movement relative to a vehicle on an axis of rotation. The trailer hitch head is also moveably connected to an arcuate guide, wherein the arcuate guide is fixedly located relative to the tow vehicle. The trailer hitch head may slidably move along the arcuate guide in response to required, rotational motion from the tow vehicle and/or trailer.

In another embodiment, a fifth-wheel hitch assembly having a rotatable and slidable trailer hitch head and two arcuate guides to receive the trailer hitch head is disclosed. The trailer hitch head of this embodiment moveably interfaces with the arcuate guides, which are fixedly mounted to the tow vehicle. Upon the required rotational movement, the trailer hitch head is allowed to slide rearward along one of the arcuate guides relative to the direction of the rotational movement received by the trailer hitch head.

As mentioned in the first embodiment, the second embodiment of the present invention may also include a capture mechanism on the trailer hitch head to efficiently transfer rotational movement from the trailer to the base of the trailer hitch head. Additionally, the alternative embodiment may also include a guide ramp. The guide ramp may include a guide plate mounted under the arcuate guides and moveably connected to the base of the trailer hitch head, a guide mechanism, and/or a predesigned path along which the guide mechanism may travel.

In yet another embodiment, a fifth-wheel hitch assembly is provided. The assembly includes a rotatable and slidable trailer hitch head to receive a portion of a trailer and a capture mechanism connected to the trailer hitch head to efficiently transfer rotational movement from a connected trailer to the base of the trailer hitch head. The hitch assembly also includes two or more arcuate guides housed within the base of the hitch assembly. The trailer hitch head is moveably connected to the arcuate guide. The base is mounted in a fixed position on the tow vehicle.

This embodiment of the hitch assembly also includes a guide ramp comprising a guide plate, a guide mechanism, and/or a predesigned path for the guide mechanism to move along. The guide ramp is integrally formed with the underside of the base of the hitch assembly. Upon receiving the requisite rotational movement from the capture mechanism and/or from the tow vehicle, the base of the trailer hitch head rotates which, in turn, rotates the guide ramp's guide mechanism. Once enough rotational movement is received, based on the direction of the rotational movement, the guide mechanism moves the trailer hitch head into one of the arcuate guide paths. This allows the trailer hitch head to slidably move toward the rear of the tow vehicle along the arcuate guide path.

This embodiment also provides a plurality of mounting points for connecting the base of the hitch assembly to the frame and/or bed of the tow vehicle. Alternatively, the base can include a plurality of mounting points to connect the base of the hitch assembly to one or more brackets or rails secured to the frame and/or bed of a tow vehicle. The aforementioned embodiments all enable the trailer hitch head to slide back to its initial, straight-line towing position in response to counter-rotational movement. Accordingly, the present invention provides a fifth-wheel hitch assembly that may automatically move rearward along an arcuate path in order to provide greater maneuverability for tow vehicles, even in the case of short-bed pickup truck tow vehicles, and trailer during tight turns as well as automatically sliding back to the initial position for straight-line towing efficiency and stability.

DETAILED DESCRIPTION

The following is a detailed description of an embodiment of a fifth-wheel hitch assembly 100 (sometimes "assembly" or "hitch assembly"). The hitch assembly 100 is mounted to a towing vehicle 102 (sometimes "vehicle" or "tow vehicle") and is adapted to receive a portion of a trailer 104. Exemplary uses for the fifth-wheel hitch assembly 100 of the present invention include, but are not limited to, coupling a recreational trailer or camper to a short-bed pickup truck or connecting a cargo trailer to a flatbed truck. The hitch assembly 100 of the present invention may be used in any fifth-wheel coupling, such as those having a kingpin that is received by a fifth-wheel trailer hitch head. The trailer hitch head utilized with the hitch assembly 100 of the preferred embodiment of the present invention is contemplated as the trailer hitch head described in U.S. patent application Ser. No. 14/049,613 to Kraai. The contents of U.S. patent application Ser. No. 14/049,613 to Kraai is hereby incorporated in its entirety by reference. However, it should be appreciated by one skilled in the art that a trailer hitch head of any style or latching mechanism, allowing the necessary range of motion required by the hitch assembly 100 of the present invention, may be used without departing from the scope of the present invention.

In the described embodiments, the hitch assembly 100 is attached to the towing vehicle 102 and the provided trailer hitch head 106 is adapted to accept a kingpin attached to a trailer 104. Further the directions "forward", "front" and similar terms refer to the direction of the front of the towing vehicle from the hitch assembly 100. Moreover, "behind", "back", "rear", "rearward" and similar terms refer to the direction of the rear of the towing vehicle from the initial position of the hitch assembly 100 toward the trailer 104. Accordingly, the towing vehicle 102 is generally in front of the assembly 100, while the trailer 104 is behind the assembly 100. It should be appreciated by one skilled in the art that the kingpin and assembly 100 may be reversed such that the towing vehicle 102 includes a kingpin which is received by a latching mechanism on a trailer 104 without departing from the scope of the invention.

Figure 1:
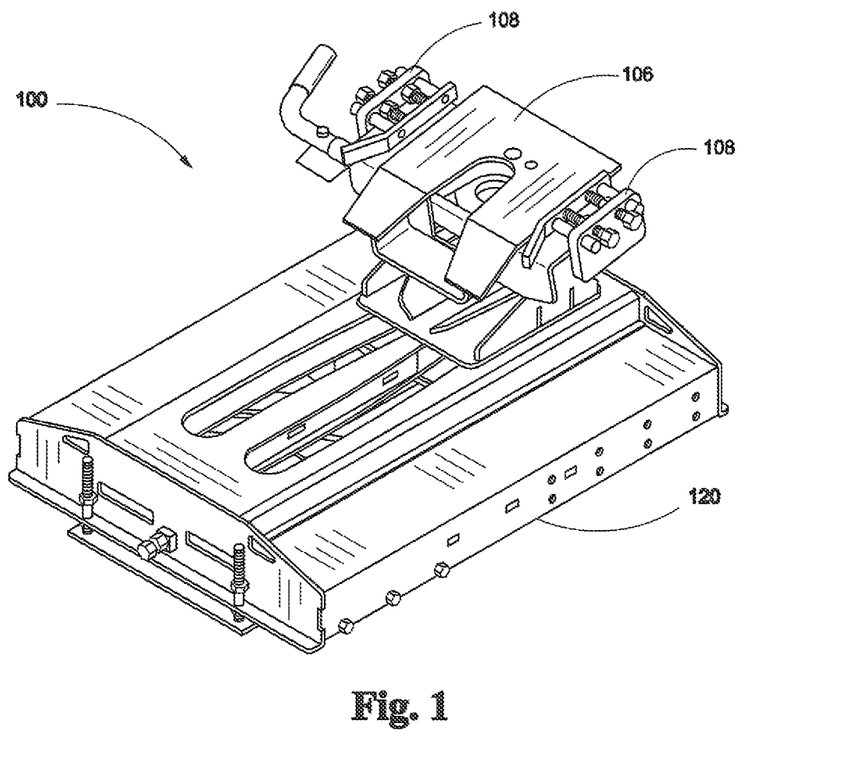
FIG. 1 is a perspective view of the fifth-wheel hitch assembly according to one embodiment of the fifth-wheel hitch assembly of the present invention.
Figure 2:
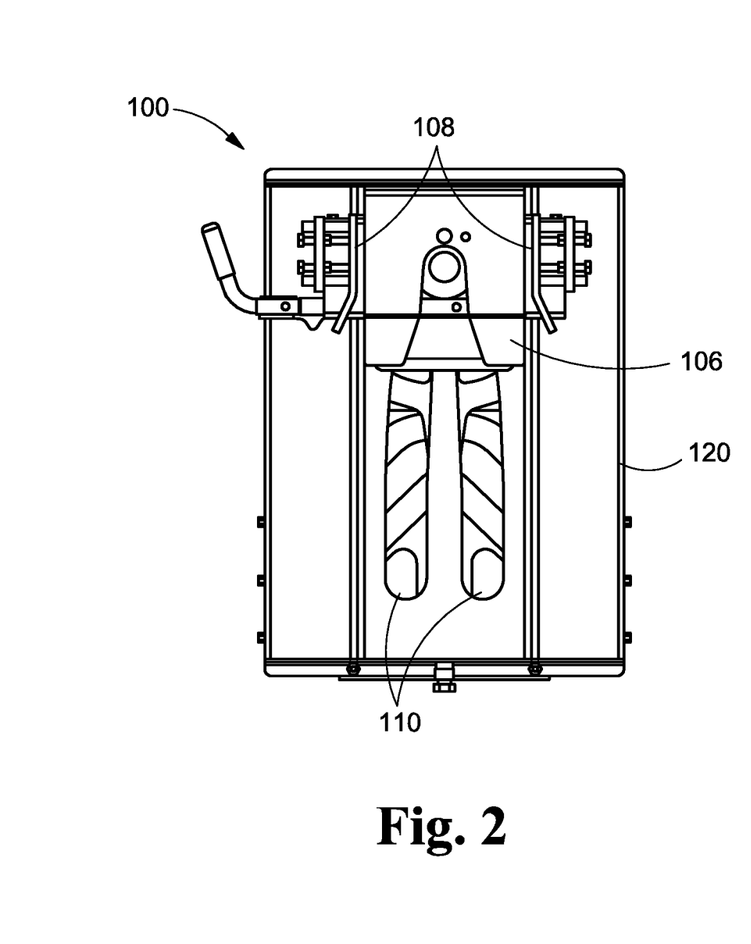
FIG. 2 is a top plan view of the fifth-wheel hitch assembly according to one embodiment of the fifth-wheel hitch assembly of the present invention.
Figure 13:
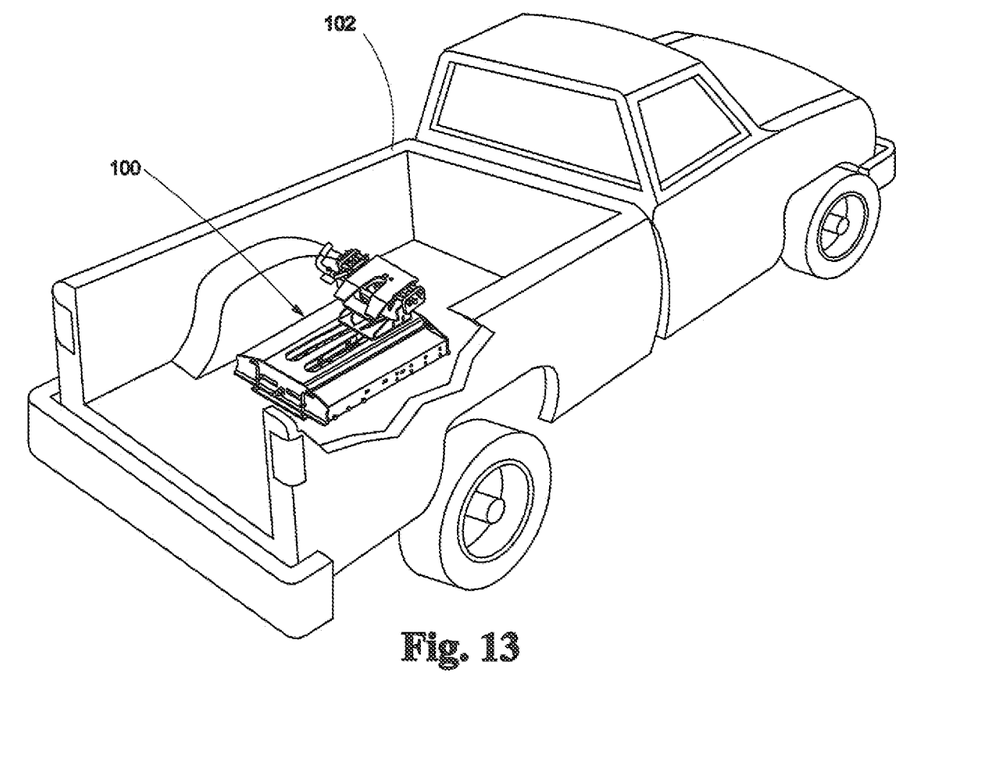
FIG. 13 is a perspective view of the fifth-wheel hitch assembly of the present invention as mounted in the bed of a tow vehicle.
Figure 14:
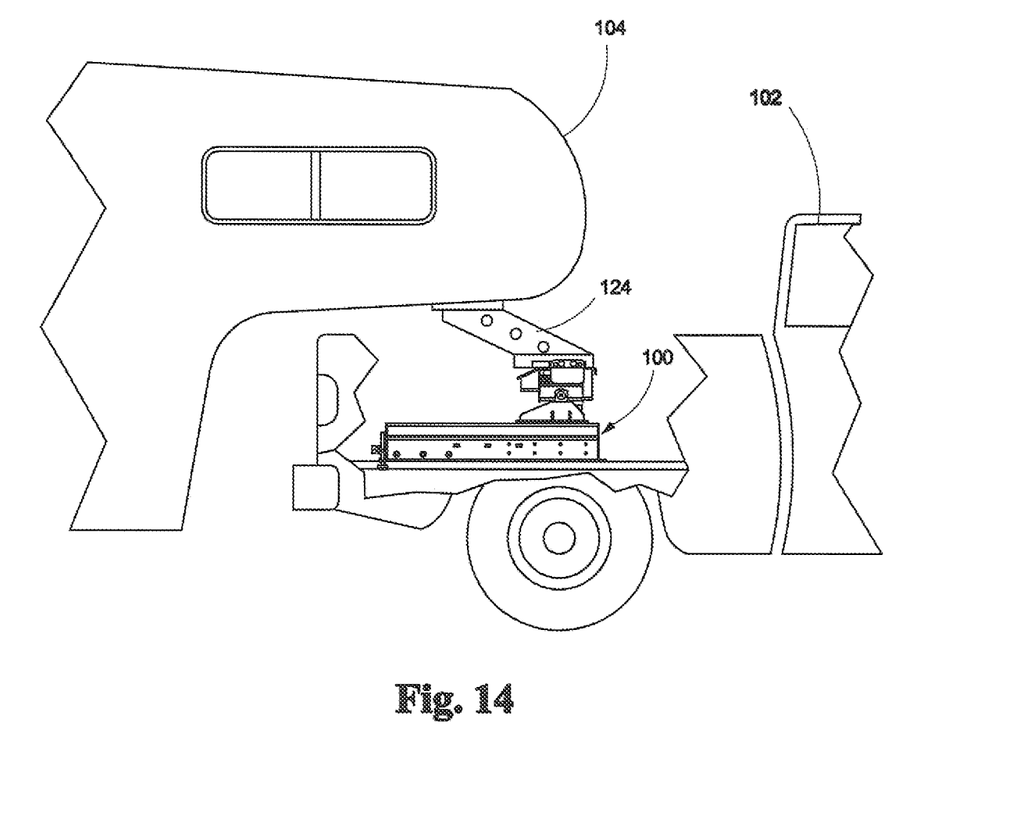
FIG. 14 is a cut-away side elevational view of the fifth-wheel hitch assembly of the present invention as interfaced with a portion of a trailer.

Referring to FIGS. 1 and 2, a fifth-wheel hitch assembly 100 according to the exemplary embodiment of the present invention is shown. In the exemplary embodiment of the assembly 100 as depicted in FIG. 1, the assembly 100 includes a trailer hitch head 106 to receive the kingpin of a trailer 104 (FIG. 14). However, it should be appreciated by one skilled in the art that any type of latching mechanism, now known or in the future, may be utilized with the trailer hitch head 106 without departing from the scope of the present invention. Also present is a capture mechanism 108 which comprises a reinforced plate perpendicular to and extending from each lateral edge of the top plane of the trailer hitch head 106. As shown in FIG. 1, the capture mechanism may comprise of one or more auxiliary angled pieces, to aid in guiding the latching mechanism of the trailer 104 to the correct position for latching with the trailer hitch head 106. It is anticipated that the capture mechanism 108 utilize metal materials for each of the pieces comprising the capture mechanism 108. However, it should be appreciated by one skilled in the art that any material capable of withstanding the forces exerted on the capture mechanism 108 by the trailer 104 and the act of towing same by a towing vehicle 102 could be utilized without departing from the scope of the present invention. FIG. 2 illustrates the preferred embodiment of the present invention from a top-down view providing further details regarding the base 120 of the assembly 100. As shown in FIG. 1, FIG. 2 also illustrates the arcuate shape of one or more guides 110 that allow the trailer hitch head 106 to move laterally and rearward relative to the initial position of the trailer hitch head 106 during turning maneuvers initiated by the towing vehicle 102 (FIGS. 13 and 14).

Figures 4, 5:
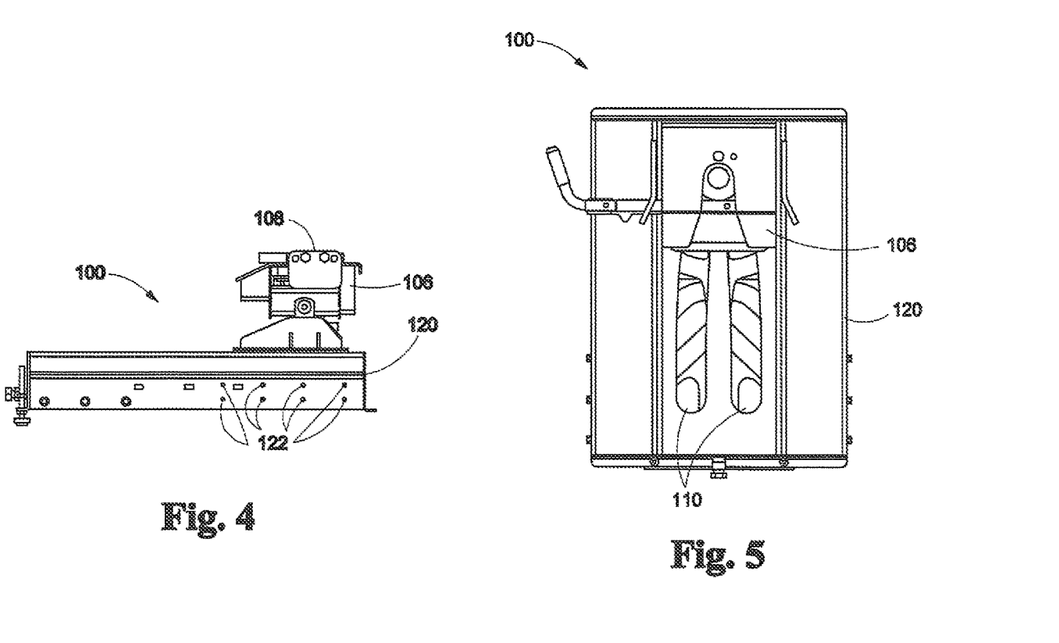
FIG. 4 is a side elevational view of the fifth-wheel hitch assembly of FIG. 2 in its straight-line towing position.
FIG. 5 is a top plan view of the fifth-wheel hitch assembly according to a second embodiment of the fifth-wheel hitch assembly of the present invention.

Turning briefly to FIG. 4, a side elevational view of the hitch assembly 100 in the initial position is shown. The trailer hitch head 106 may be rotated around an axis in response to rotational movement received from the trailer 104 (FIG. 12), via the capture mechanism 108 in the preferred embodiment, and/or in response to lateral movement from the towing vehicle 102. The rotational movement of the trailer hitch head 106 brings about corresponding rotational movement in a guide plate 114 connected to the trailer hitch head 106 and positioned on the underside of the base 120 (FIGS. 6-12). The side elevational view of FIG. 4 also illustrates the plurality of mounting points 122 to mount the base 120 of the assembly 100 to the frame or bed of a towing vehicle 102.

Figure 3:
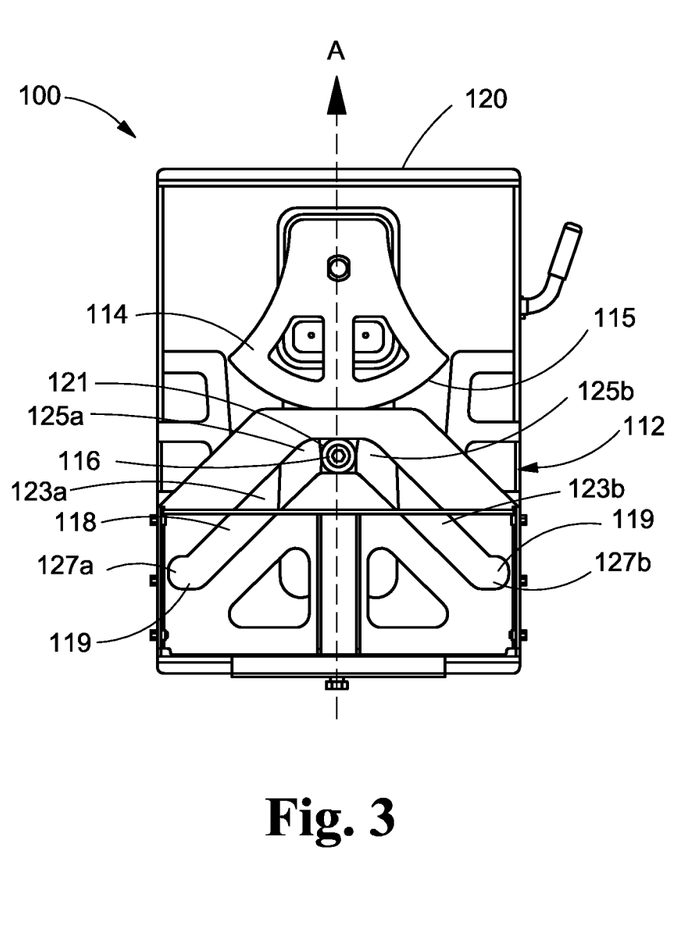
FIG. 3 is a bottom plan view of the fifth-wheel hitch assembly of FIG. 2 in its straight-line towing position.
Figure 9:
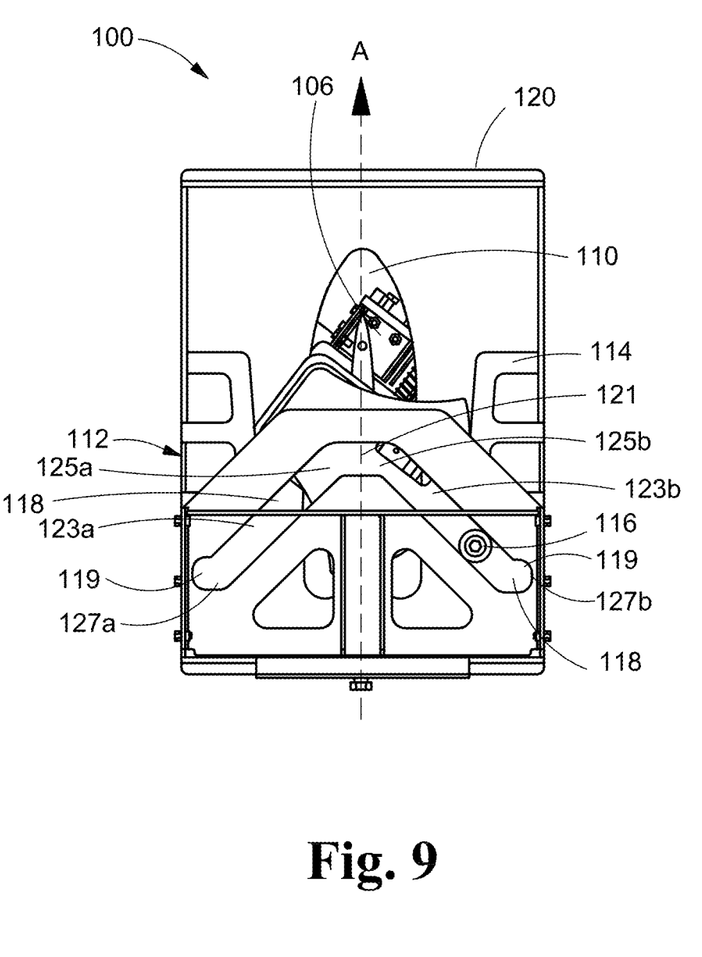
FIG. 9 is a bottom plan view of the fifth-wheel hitch assembly of FIG. 8 in a rotated position.

Looking to FIG. 3, a bottom plan view of the hitch assembly 100 of the preferred embodiment is shown. The trailer hitch head 106 at the top of the assembly 100 is again at the initial position. As illustrated in FIG. 3, the trailer hitch head 106 (FIG. 2) is integrally connected with a guide plate 114 of the guide ramp 112. The guide plate 114 includes an arcuate edge 115. The trailer hitch head 106 is also connected to a guide mechanism 116 although alternative embodiments are anticipated wherein the guide plate also acts as the guide mechanism. Upon rotational movement of the trailer hitch head 106, the integrally attached guide plate 114 also rotates which causes corresponding, relative movement in the connected guide mechanism 116. The guide mechanism is restricted in movement along a predesigned path 118 of the guide ramp 112 as illustrated in FIG. 3. The predesigned path 118 includes a center portion 121 and two side portions 123a. 123b (shown in FIGS. 3 and 9). The two side portions 123a, 123b each have proximate ends 125a, 125b and distal ends 127a, 127b (shown in FIGS. 3 and 9). As shown in FIGS. 3 and 9, the distal ends 127a, 127b are further from the longitudinal axis A of the apparatus 100 than said proximate ends 125a, 125b. It should be appreciated by one skilled in the art that any shape for the predesigned path that results in the desired movement of the trailer hitch head 106 may be used without departing from the scope of the present invention. Movement of the guide plate 114 and guide mechanism 116 along the predesigned path 118, directs the trailer hitch head 106 into an arcuate guide 110 that allow the trailer hitch head 106 to move laterally and rearward relative to the initial position of the trailer hitch head 106 (FIG. 2). Movement of the trailer hitch head 106 along the arcuate guide 110 allows for greater maneuverability of the towing vehicle 102 during tight turns and similar maneuvers.

As the trailer hitch head 106 (FIG. 2), and consequently the connected trailer 104 (FIG. 14), rotate back toward their initial position, the guide plate 114 and attached guide mechanism 116 are moved forward along the predesigned path 118 toward the guide mechanism's 116 initial position in the predesigned path 118. This movement causes the trailer hitch head 106 to move forward along the arcuate guide 110 (FIG. 2), thus moving the trailer hitch head 106 back to its initial position for straight-line towing efficiency and stability. The guide ramp 112 of the preferred embodiment of the present invention greatly reduces the number of moving parts needed for the automatic sliding mechanism of the attached trailer hitch 106 compared with traditional auto-slide systems. Moreover, there is no need for teeth or grooves between each piece of the guide ramp 112 and there is a reduced reliance on anti-friction solutions, such as grease, anti-friction bushings, spacers, etc., to maintain the reliability of the guide ramp 112 of the preferred embodiment of the present invention. However, it should be appreciated by one skilled in the art that gears, teeth, bushings, spacers, and/or anti-friction solutions can be utilized with the guide ramp 112 of the present invention, without departing from the scope of the present invention.

The initial position of the trailer hitch head 106 depicted in various views in FIGS. 1-4 corresponds to the straight-line towing position for a trailer 104 connected to a towing vehicle 102 via the hitch assembly 100 of the present invention. In this position the trailer hitch head 106 is, ideally, located above or slightly in front of and above the rear axle of the towing vehicle 102. In this initial position the distance between the rear edge of the towing vehicle 102 and the front edge of the trailer 104 is minimized to increase the towing efficiency and stability of the vehicle 102 and connected trailer 104 (FIG. 14). However, as previously discussed, it is advantageous and desired to increase the distance between the rear of the towing vehicle 102 and the front of the trailer 104 during maneuvering by the towing vehicle 102, such as while trying to navigate a tight turn. Without such rearward movement of the trailer 104 away from the towing vehicle 102, a tight turn by a towing vehicle 102 will cause the distance between the corresponding rear corner of the towing vehicle 102 and opposing front corner of the trailer 104 to decrease until the two corners make contact. By increasing the distance between the trailer 104 and the towing vehicle 102 during tight maneuvers, the opposing corners of the two objects will not come in contact with one another, thus avoiding damage to both the trailer 104 and towing vehicle 102.

Looking again to FIG. 2, also depicted are the arcuate guides 110 corresponding to allowed arcuate movement of the trailer hitch head 106 along an arcuate path. The arcuate path provides several key benefits compared to traditional straight/longitudinal hitch movement. The primary advantage of utilizing an arcuate guide path for the trailer hitch head 106 is that it increases the amount of travel within the same relative space compared to a straight-line travel path. This becomes especially desired when utilizing a fifth-wheel hitch assembly in a short bed pickup truck where the pickup truck bed is restricted in the amount of length the guides can allow. Additionally, with the prevalence of side-mounted cargo boxes along the length of pickup truck beds, the available width within the bed of pickup trucks is often reduced. Arcuate guides 110 allow a greater distance of travel, but starting out from a narrow position and slightly arching outward before coming back in at the rear-most position of the guide. In this way, the length of travel can be maintained or increased, while allowing the arcuate guides 110, and thus the base 120, to sit in a narrower footprint within the bed of the towing vehicle 102.

As discussed above, prior art auto-sliding trailer hitch systems are prone to slide-up problems which can cause unintended damage and movement to/of the trailer 104 and/or tow vehicle 102. In contrast, partially due to the arcuate shape of the guides 110 of the present invention providing additional resistance to the force exerted on the trailer hitch head 106 during deceleration, the trailer hitch head 106 in the present invention is less likely to suffer from unwanted slide-up due to unintended acceleration or deceleration forces. Additionally, the predesigned path 118 for the guide mechanism 116 of the guide ramp 112 provides a locking position 119 at the end of each side of the predesigned path 118 (FIGS. 3 and 9). This again improves over traditional systems by solving the slide-up problem of prior art systems without creating additional issues with respect to allowing the guide mechanism 116 and trailer hitch head 106 to move back to their initial positions for straight-line towing.

The arcuate guides 110 of the preferred embodiment of the present invention, as depicted in FIG. 2, are positioned between the bottom of the trailer hitch head 106 and the top of the guide ramp 112 within the base 120 of the hitch assembly 100. Accordingly, the guide plate 114 and guide mechanism 116 of the guide ramp 112 are positioned below the arcuate guides 110, but are connected to the bottom of the trailer hitch head 106. Again, this transfers rotational movement from the trailer 104, to the trailer hitch head 106, which correspondingly rotates the integrally connected guide plate 114 and/or guide mechanism 116. The trailer hitch head 106 does not require any type of interfacing gear or transfer mechanism with the guide plate 114. Instead, the trailer hitch head 106 is freely rotatable along its central axis and the guide plate 114 is integrally attached to the central axis of the trailer hitch head 106. Accordingly, any rotational movement of the trailer hitch head 106, along its freely rotating central axis, creates corresponding rotational movement in the guide plate 114 of the guide ramp 112 (FIGS. 6-12).

Turning to FIG. 5, an alternative embodiment of the hitch assembly 100 is shown. In this embodiment, rotational movement from the trailer 104 is transferred to the trailer hitch head 106 via the latching mechanism of the trailer hitch head rather than through the use of a capture mechanism 108 as discussed above. Again, once sufficient rotational motion is transferred from the trailer 104 to the trailer hitch head 106 and guide plate 114, the connected guide mechanism 116 moves along its predesigned path 118 to move the trailer hitch head 106 into the arcuate guide 110 housed within the base 120 and located above the guide ramp 112 assembly and below the bottom of the trailer hitch head 106 (FIGS. 6-12). As additional rotational movement is provided via the trailer 104 and trailer hitch head 106, the guide mechanism 116 moves further along its predesigned path 118 which, in turn, moves the rotating trailer hitch head 106 further down one of the provided arcuate guides to move the trailer hitch head 106 laterally and rearward relative to the initial position of the trailer hitch head 106 and toward the rear of the towing vehicle 102.

Upon rotational movement of the trailer hitch head 106 in the opposite direction, the connected guide plate 114 of the guide ramp 112 will move the connected guide mechanism 116 back toward its initial position along the predesigned guide ramp path 118. The movement of the guide plate 114 and guide mechanism 116 of the guide ramp 112 back toward their initial positions, will also move the connected trailer hitch head 106 forward along the arcuate guide until it, as well as the guide plate 114 and guide mechanism 116, move back to its initial position. As previously discussed, in the trailer hitch head's 106 initial position, the trailer hitch head 106 is substantially rearward facing relative to the towing vehicle 102 which maintains the connected trailer 104 in a straight plane with the towing vehicle 102 and decrease the distance between the rear of the towing vehicle 102 and the front of the trailer 104 to its minimum distance. Upon further rotational movement in the opposing direction, the trailer hitch head 106, guide plate 114, and guide mechanism 116 will rotate in the opposing direction directing the trailer hitch head into the other end of the arcuate guide 110 to move the trailer hitch head 106 laterally and rearward again, but for an opposing direction turn by the towing vehicle 102.

Figure 6:
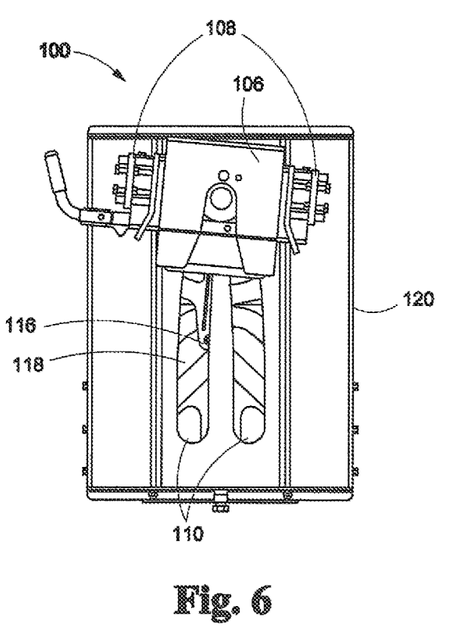
FIG. 6 is a top plan view of the fifth-wheel hitch assembly of the first embodiment of the fifth-wheel hitch assembly of the present invention in a slightly rotated position.
Figure 7:
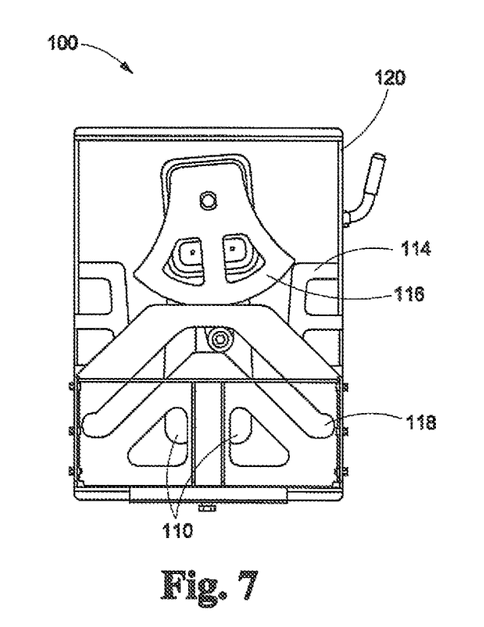
FIG. 7 is a bottom plan view of the fifth-wheel hitch assembly of FIG. 6 in a slightly rotated position.

FIGS. 6-12 depict the preferred embodiment of the hitch assembly 100 of the present invention as a left hand turn is completed by a towing vehicle 102 to which the hitch assembly 100 is mounted. If the towing vehicle 102 undertook a right hand turn, the trailer hitch head 106 would move along the opposite arcuate guide 110. FIGS. 6 and 7 illustrate the start of a left hand turn by the towing vehicle 102. FIG. 6 illustrates the slightly rotated position of the trailer hitch head 106 at the start of the turning maneuver. FIG. 7 depicts the underside of the base at the same moment in the turn as that shown in FIG. 6. As shown in FIG. 7, the guide plate 114 and guide mechanism 116 of the guide ramp 112 both begin to move in response to rotation of the connected trailer hitch head 106. Although no rearward movement of the trailer hitch head 106 along the arcuate guide 110 occurs at this point in the turn, shown is the guide mechanism 116 beginning to move along the predesigned path 118 of the guide ramp 112.

Figure 8:
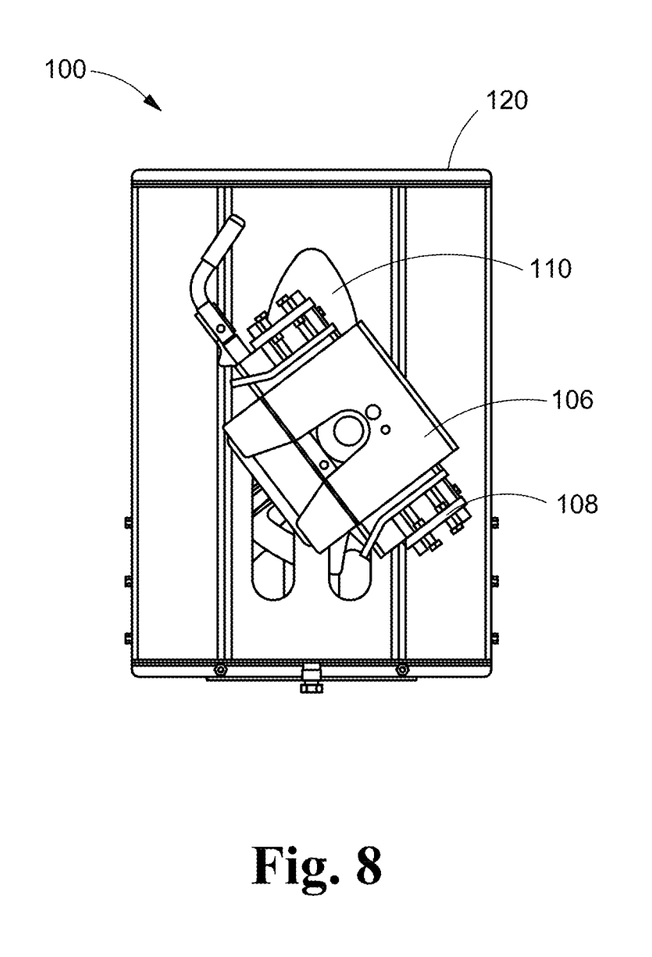
FIG. 8 is a top plan view of the fifth-wheel hitch assembly of the first embodiment of the fifth-wheel hitch assembly of the present invention in a rotated position.
Figure 10:
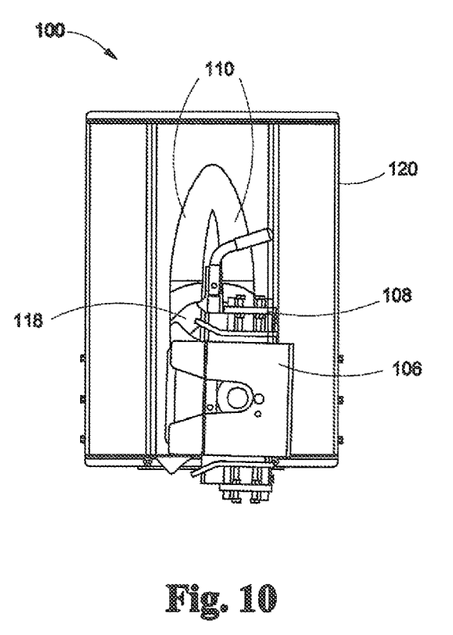
FIG. 10 is a top plan view of the fifth-wheel hitch of the first embodiment of the fifth-wheel hitch assembly of the present invention in a fully rotated position.
Figure 11:
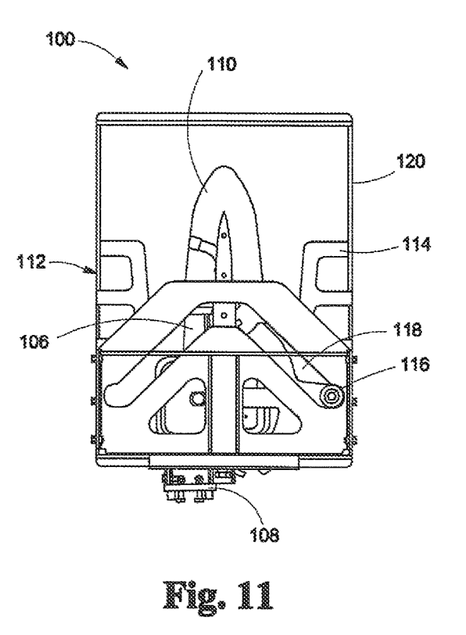
FIG. 11 is a bottom plan view of the fifth-wheel hitch assembly of FIG. 10 in a fully rotated position.
Figure 12:
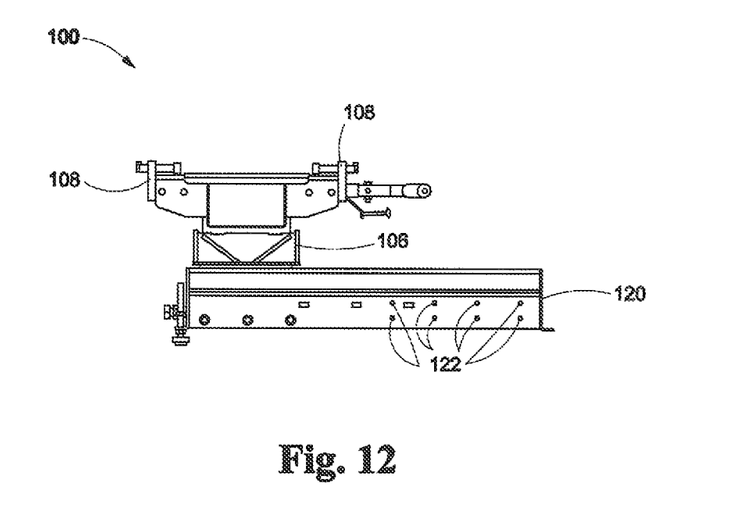
FIG. 12 is a side elevational view of the fifth wheel hitch assembly of FIG. 10 in a fully rotated position.

FIGS. 8 and 9 depict the preferred embodiment of the hitch assembly 100 of the present invention as the trailer hitch head 106 rotates and slides rearward along the left turning path arcuate guide to allow greater maneuverability for the towing vehicle 102 while managing a left turn. FIG. 8 depicts the trailer hitch head 106 orientation as it rotates in response to rotational motion captured form the connected trailer 104. FIG. 9 depicts the underside of the base 120 of the hitch assembly 100, showing the position of the guide mechanism 116 along the predesigned path 118 of the guide ramp 112 at the same moment in the left hand turn as that shown in FIG. 8. FIGS. 10, 11, and 12 depict the hitch assembly 100 of the preferred embodiment of the present invention in a fully rotated, left turn position. FIG. 10 illustrates the position of the trailer hitch head 106 on the hitch assembly 100 at the end of the left-turn arcuate guide 110 and fully rotated to allow for greater maneuverability of the towing vehicle 102 completing a left-hand turn while connected to a trailer 104 via the hitch assembly 100 of the present invention. FIG. 11 shows the underside of the base 120 of the hitch assembly 100 at the same moment during the left-hand turn as depicted in FIG. 10. As shown in FIG. 11, the guide mechanism 116 of the guide ramp 112 is in the locked position of the predesigned path 118. This locked position, in association with the naturally occurring slide-up resistance due to the shape of the arcuate guide 110, restricts unintended slide-up of the trailer 104 due to forces exerted by the towing vehicle 102, such as deceleration, while requiring no additional effort needed to allow the trailer hitch head 106 to move back to its initial position at the top of the arcuate guides 110 for straight-line towing. FIG. 12 shows a side elevation view of the hitch assembly at the same moment during the left-hand turn as depicted in FIG. 10.

Looking to FIG. 13, shown is the preferred embodiment of the hitch assembly 100 of the present invention as mounted to a towing vehicle 102. As depicted in the preferred embodiment, the base 120 of the hitch assembly 100 includes a plurality of mounting points 122 to directly mount the hitch assembly 100 to the frame or bed of a towing vehicle 102. However, it is also provided that the base 120 of the hitch assembly 100 may include a plurality of mounting points 122 to connect the base 120 to one or more brackets 124 mounted to the frame or bed of a towing vehicle 102. It should be appreciated by one skilled in the art that although brackets are utilized to connect the base 120 of the hitch assembly 100 to the frame or bed of a towing vehicle 102, any type of mounting system can be utilized, for example rails, hubs, etc., without departing from the scope of the present invention.

FIG. 14, shows the preferred embodiment of the hitch assembly 100 of the present invention as mounted in a towing vehicle 102 via the base 120 of the assembly 100 and connected to a trailer 104 via the trailer hitch head 106. As shown, the trailer 104 is oriented in a straight-line towing position relative to the towing vehicle 102. As a result, the trailer hitch head 106 of the present invention is at its initial position directly above or in front of and above the rear axle of the towing vehicle 102. As the towing vehicle 102 turns in either direction, the trailer hitch head 106 will rotate with the trailer 104 in an opposing direction. The rotation of the trailer hitch head 106 will cause the guide ramp 112 components to rotate in a corresponding direction which will direct the trailer hitch head 106 into one of the branches of the arcuate guide 110 (FIGS. 6-12). Movement of the trailer hitch head 106 rearward along the arcuate guide 110, while allowing further rotational movement of the trailer hitch head 106, increases the distance between the towing vehicle 102 and trailer 104, thus offering the towing vehicle 102 greater maneuverability without coming into contact with the connected trailer 104.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents.

What is claimed is:

1. An apparatus for connecting a trailer to a vehicle comprising:
   a. a trailer hitch head to receive a portion of a trailer;
   b. wherein said trailer hitch head allows for slidable and rotational movement along an arcuate guide relative to said vehicle on an axis of rotation;
   c. said trailer hitch head is moveably connected to said arcuate guide comprising an arcuate-shaped guide path;
   d. wherein said arcuate guide is fixedly located relative to said vehicle;
   e. wherein said trailer hitch head may slidably move along said arcuate guide such that said trailer hitch head is arcuately displaced along said arcuate guide; and
   f. wherein said trailer hitch head is guided into said arcuate-shaped guide path of said guide by a guide ramp and said guide ramp includes a predesigned path having at least one locking position.

2. The apparatus of claim 1 wherein said trailer hitch head may rotate while slidably moving along said arcuate-shaped guide path of said arcuate guide.

3. The apparatus of claim 1 wherein said trailer hitch head includes a capture mechanism means to transfer rotational movement of said trailer to the base of said trailer hitch head.

4. The apparatus of claim 1 wherein said trailer hitch head is moveably connected to said guide ramp comprising an arcuate shaped guide path.

5. The apparatus of claim 4 wherein said guide ramp comprises at least two of a guide plate, a guide mechanism, and a predesigned path for said guide mechanism to travel along.

6. The apparatus of claim 4 wherein said guide ramp is connected to the underside of a base containing said arcuate guide comprising an arcuate shaped guide path.

7. The apparatus of claim 6 wherein said guide ramp moves said trailer hitch head into said arcuate-shaped guide path of said arcuate guide in relation to lateral movement from said vehicle.

8. The apparatus of claim 4 wherein said guide plate includes an arcuate edge and wherein upon rotational movement of the trailer hitch, said apparatus is configured to correspondingly rotate said guide plate which moves said guide mechanism along said predesigned path, thereby directing said trailer hitch head into said arcuate guide to allow the trailer hitch head to move laterally and rearward relative to an initial position of said trailer hitch head, wherein said initial position is the position of said trailer hitch head when said apparatus is traveling in a straight line in the direction of the longitudinal axis of the apparatus.

9. The apparatus of claim 1 further comprising a plurality of mounting points for connecting said apparatus to the frame or bed of a vehicle.

10. The apparatus of claim 1 further comprising a plurality of mounting points to connect said apparatus to a bracket or a rail secured to the frame or bed of a vehicle.

11. The apparatus of claim 1 wherein opposing rotational movement moves said guide ramp back to its originating position which guides said trailer hitch head forward along said arcuate-shaped guide path of said arcuate guide to said trailer hitch head's originating position.

12. The apparatus of claim 1 wherein said predesigned path includes a center portion and two side portions, said two side portions each having proximate ends and distal ends, wherein said distal ends are further from the longitudinal axis of said apparatus than said proximate ends.

13. The apparatus of claim 1 wherein said apparatus includes two locking positions that are located at the distal ends of said predesigned path.

14. An apparatus for connecting a trailer to a vehicle comprising:
   a. A trailer hitch head for receiving a portion of a trailer;

b. Said trailer hitch head allows for slidable and rotational movement relative to a vehicle on an axis of rotation;

c. Said trailer hitch head moveably connected to at least two adjacent guides comprising an arcuate-shaped guide path;

d. Wherein said guides are fixedly located relative to said vehicle; and e. wherein said trailer hitch head may rotate while slidably moving along said arcuate-shaped path of said guides such that said trailer hitch head is arcuately displaced along said guides;

f. a guide ramp, moveably connected to said trailer hitch head, guides said trailer hitch head into one of said arcuate shaped guide paths of said guides; and g. wherein said trailer hitch head is guided into said arcuate-shaped guide path of said guide by the guide ramp and said guide ramp includes a predesigned path having at least one locking position.

15. The apparatus of claim 14 wherein said trailer hitch head includes a capture mechanism means to transfer rotational movement of said trailer to a base of said trailer hitch head.

16. The apparatus of claim 14 wherein said guide ramp comprises at least two of a guide plate, a guide mechanism, and a predesigned path for said guide mechanism to travel along.

17. The apparatus of claim 14 wherein said guide ramp is connected to the underside of the base containing said guides comprising an arcuate-shaped guide path.

18. The apparatus of claim 14 wherein said guide ramp moves said trailer hitch head into one of said arcuate-shaped guide paths of said guides in relation to lateral movement from said vehicle.

19. The apparatus of claim 14 further comprising a plurality of mounting points for connecting said apparatus to the frame or bed of a vehicle.

20. The apparatus of claim 14 further comprising a plurality of mounting points to connect said apparatus to a bracket or rail secured to the frame or bed of a vehicle.

21. The apparatus of claim 14 wherein opposing rotational movement moves said guide ramp back to its originating position which guides said trailer hitch head forward along said arcuate-shaped guide path of said guides to said trailer hitch head's originating position.

22. An apparatus for connecting a trailer to a vehicle comprising:

a. A trailer hitch head for receiving a portion of a trailer;

b. Wherein said trailer hitch head includes a capture mechanism;

c. Said trailer hitch head allows for slidable and rotational movement relative to a vehicle on an axis of rotation;

d. Said trailer hitch head moveably connected to at least two adjacent guides comprising an arcuate-shaped guide path;

e. Wherein said guides are housed within a base that is fixedly located relative to said vehicle;

f. wherein said trailer hitch head may rotate while slidably moving along said arcuate-shaped guide path of said guides such that said trailer hitch head is arcuately displaced along said arcuate guide path;

g. said trailer hitch head is also moveably connected to a guide ramp;

h. wherein said guide ramp comprises at least one of a guide plate and a guide mechanism and said guide ramp further comprises a predesigned path for said guide mechanism to travel along, said predesigned path including at least one locking position;

i. said guide ramp is connected to the underside of said base containing said guides; and j. wherein said guide ramp moves said trailer hitch head into or out of one of said arcuate-shaped guide paths of said guides in relation to lateral movement from said vehicle.

23. The apparatus of claim 22 further comprising a plurality of mounting points for connecting said apparatus to the frame or bed of a vehicle.

24. The apparatus of claim 22 further comprising a plurality of mounting points to connect said apparatus to a bracket or rail secured to the frame or bed of a vehicle.

* * * * *